(12) United States Patent
Chiao et al.

(10) Patent No.: US 7,160,637 B2
(45) Date of Patent: Jan. 9, 2007

(54) IMPLANTABLE, MINIATURIZED MICROBIAL FUEL CELL

(75) Inventors: Mu Chiao, Beaverton, OR (US); Liwei Lin, Castro Valley, CA (US); Kien-Bang Lam, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 431 days.

(21) Appl. No.: 10/445,736

(22) Filed: May 27, 2003

(65) Prior Publication Data
US 2004/0241528 A1 Dec. 2, 2004

(51) Int. Cl.
H01M 8/10 (2006.01)
H01M 8/16 (2006.01)

(52) U.S. Cl. .............................. 429/2; 429/30; 429/43

(58) Field of Classification Search .................... None
See application file for complete search history.

(56) References Cited

U.S. PATENT DOCUMENTS

| | | | |
|---|---|---|---|
| 3,226,262 A * | 12/1965 | Rohrback et al. ............... | 429/2 |
| 3,331,848 A * | 7/1967 | Davis et al. .................... | 429/2 |
| 3,340,094 A * | 9/1967 | Helmuth ......................... | 429/2 |
| 3,941,135 A | 3/1976 | von Sturm et al. | |
| 4,294,891 A | 10/1981 | Yao et al. | |
| 4,578,323 A | 3/1986 | Hertl et al. | |
| 5,976,719 A | 11/1999 | Kim et al. | |
| 6,270,649 B1 | 8/2001 | Zeikus et al. | |
| 6,294,281 B1 | 9/2001 | Heller | |
| 6,495,023 B1 | 12/2002 | Zeikus et al. | |
| 6,497,975 B1 | 12/2002 | Bostaph et al. | |
| 6,500,571 B1 | 12/2002 | Liberatore et al. | |
| 6,531,239 B1 | 3/2003 | Heller | |

OTHER PUBLICATIONS

Park et al, "Improved Fuel Cell and Electrode Designs for Producing Electricity from Microbial Degradation", Biotechnology and Bioengineering, vol. 81, No. 3 (© Feb. 5, 2003, Wiley Periodicals, Inc.), pp. 348-355.
Mano et al, "A Miniature Biofuel Cell Operating in a Physiological Buffer", Journal of American Chemical Society, vol. 124, No. 44 (© American Chemical Society), pp. 12962-12963, (no month).
Katz et al, "A Non Compartmentalized Glucose|O2 Biofuel Cell by Bioengineered Electrode Surfaces", Journal of Electroanalytical Chemistry (© 1999, Elsevier Science S.A.), pp. 64-68, (no month).

(Continued)

Primary Examiner—John S. Maples
(74) Attorney, Agent, or Firm—Michaelson & Associates; Peter L. Michaelson; George Wolken, Jr.

(57) ABSTRACT

A miniaturized microbial fuel cell is described deriving electrical power from the biological activity of microbes, typically the metabolism of glucose by baker's yeast. Microfabrication techniques are used to miniaturize the components as well as the overall fuel cell and are capable of integration with other biomedical and implantable devices. Substantial reductions in both the size and the cost of implantable systems are thereby achievable. Electrode structures are used that facilitate electron transfer and power production giving favorable power densities in a miniature fuel cell. In addition, the microbial fuel cell of the present invention extracts glucose or other metabolite(s) from the ambient body fluids as its fuel, thus achieving a renewable, long-term power source for implantable biomedical devices.

6 Claims, 14 Drawing Sheets

OTHER PUBLICATIONS

H.P. Bennetto, "Electricity Generation by Microorganisms", Biotechnology Education, vol. 1, No. 4, 1990, pp. 163-168, reprinted by National Centre for Biotechnology Education, The University of Reading, www.ncbe.reading.ac.uk (© 1990, Pergamon Press plc.), (no month).

* cited by examiner

IMPLANTABLE, MINIATURIZED MICROBIAL FUEL CELL

STATEMENT REGARDING FEDERALLY SPONSORED RESEARCH OR DEVELOPMENT

This invention was made with Government support under Grant (contract) No. F30602-00-2-0566 awarded by DARPA. The Government has certain rights to this invention.

BACKGROUND OF THE INVENTION

1. Field of Invention

This invention relates generally to the field of microbial fuel cells and, more particularly, to miniaturized microbial fuel cells suitable for bioimplantation as well as to components and microfabrication techniques related thereto.

2. Description of the Prior Art

The use of biochemical activity of microorganisms to generate electricity has been studied by several groups of investigators. See, for example, the work of Kim et al (U.S. Pat. No. 5,976,719), Zeikus et al (U.S. Pat. Nos. 6,270,649 and 6,495,023) and references cited therein. Indeed, microbial electrochemistry and the generation of electrical power by means of a microbial fuel cell is sufficiently well developed to have become a teaching tool. For example, see H. P. Bennetto, "Electricity Generation by Microorganisms", appearing in *Biotechnology Education*, Vol. 1, No. 4, pp. 163–168 (1990). Typical applications for microbial fuel cells have included the generation of electricity as a useful by-product from otherwise economically burdensome waste products, such as sewage sludge.

Other approaches to microbial electricity generation have included the use of isolated enzymes, typically immobilized on an electrode, rather than living microbes as the source of electromotive force. For example, see the work of Heller (U.S. Pat. Nos. 6,294,281 and 6,531,239), Liberatore et al (U.S. Pat. No. 6,500,571), Katz et al (J. Electroanaly. Chem., Vol. 479, pp. 64–68 (1999)), and references cited therein. Other approaches to fuel cell operation include the direct methanol fuel cell of Bostaph et al (U.S. Pat. No. 6,497,975) and the anaerobic oxidation of hydroxylic compounds in the presence of a quinone (Hertl et al, U.S. Pat. No. 4,578,323).

Concurrently with developments in microbial fuel cell technology, the need for miniature sources of electrical power has expanded due in part to advances in microdevices, MicroElectroMechanical Systems (MEMS) and implantable biomedical devices such as pacemakers, sensors, pain relief stimulators, among others. Implantable devices in particular call for a long-term power source, compatible with long-term residence in a human or animal biological system. Lithium batteries have been used for many years in high-power applications such as cardiac pacemakers, defribulators, among others. However, lithium battery power sources tend to be relatively bulky and expensive. Thus, various researchers have investigated biofuel cells to power implantable devices. See, for example, the non-microbial, glucose-powered fuel cell of Yao et al (U.S. Pat. No. 4,294,891), and the pacemaker power by a biofuel cell of Sturm et al (U.S. Pat. No. 3,941,135).

The miniature fuel cells operating on chemical fuels without the intervention of a microbe typically require replenishment or reactants and/or catalysts after a shorter interval than would be desirable for an implantable device. Conversely, the microbial fuel cells of the prior art are typically too bulky, chemically and/or biologically incompatible for use in conjunction with implantable devices. Thus, in view of the foregoing, a need exists in the art for an inexpensive, miniature, implantable power source capable of providing power to implantable or other MEMS devices for long periods of time.

SUMMARY OF THE INVENTION

Accordingly and advantageously, the invention provides a miniaturized microbial fuel cell deriving electrical power from the biological activity of microbes, typically baker's yeast consuming glucose. Glucose and oxygen are the only substances that are required to fuel the cell, readily available in typical biological environments. The only waste products are carbon dioxide and water. Typical applications for the microbial fuel cell of the present invention include use as a power source for implantable biomedical devices, such as sensors, stimulators, among others.

The present microbial fuel cell is miniaturized using MicroElectroMechanical Systems (MEMS) technology, capable of integration with other biomedical device. Substantial reductions in both the size and the cost of implantable systems are thereby achievable. In addition, the microbial fuel cell of the present invention extracts glucose or other metabolite(s) from the ambient body fluids as its fuel, thus achieving a renewable, long-term power source for implantable biomedical devices.

These and other advantages are achieved in accordance with the present invention as described in detail below.

BRIEF DESCRIPTION OF THE DRAWINGS

To facilitate understanding, identical reference numerals have been used, where possible, to designate identical elements that are common to the figures. The schematic drawings are not to scale and the relative dimensions of various elements in the schematic drawings are also not to scale.

The techniques of the present invention can readily be understood by considering the following detailed description in conjunction with the accompanying drawings, in which.

DETAILED DESCRIPTION

After considering the following description, those skilled in the art will clearly realize that the teachings of the invention can be readily utilized in the fabrication of miniature microbial fuel cells.

Miniature sources of electrical power are important in many applications including the provision of power for implantable biomedical devices, for powering MicroElectroMechanical Systems ("MEMS"), among other applications. The present invention relates to such a miniature power source in which the electrical power is derived from the biochemical processes of microorganisms, typically glucose metabolism by bacteria. The present invention relates in part to work attached hereto as Attachments A, B, and C.

Attachment A: "A Miniaturized Microbial Fuel Cell" by Mu Chiao, Kien B. Lam, Yu-Chuan Su and Liwei Lin, appearing in *Technical Digest of Solid-State Sensor, Actuator and Microsystems Workshop*, pp. 59–60, Hilton Head, S.C., Jun. 2–6, 2002.

Attachment B: "Micromachined Microbial Fuel Cells" by Mu Chiao, Kien B. Lam and Liwei Lin presented as a poster presentation Jan. 21, 2003 at the 16*th IEEE International MEMS Conference*, Kyoto, Japan, Jan. 19–23, 2003.

Attachment C: "MEMS Packaging by Rapid Thermal Processing," A Ph. D. dissertation submitted by Mu Chiao to the University of California, Berkeley, May 25, 2002.

The entire contents of Attachments A, B and C are incorporated herein by reference.

Figure 1:
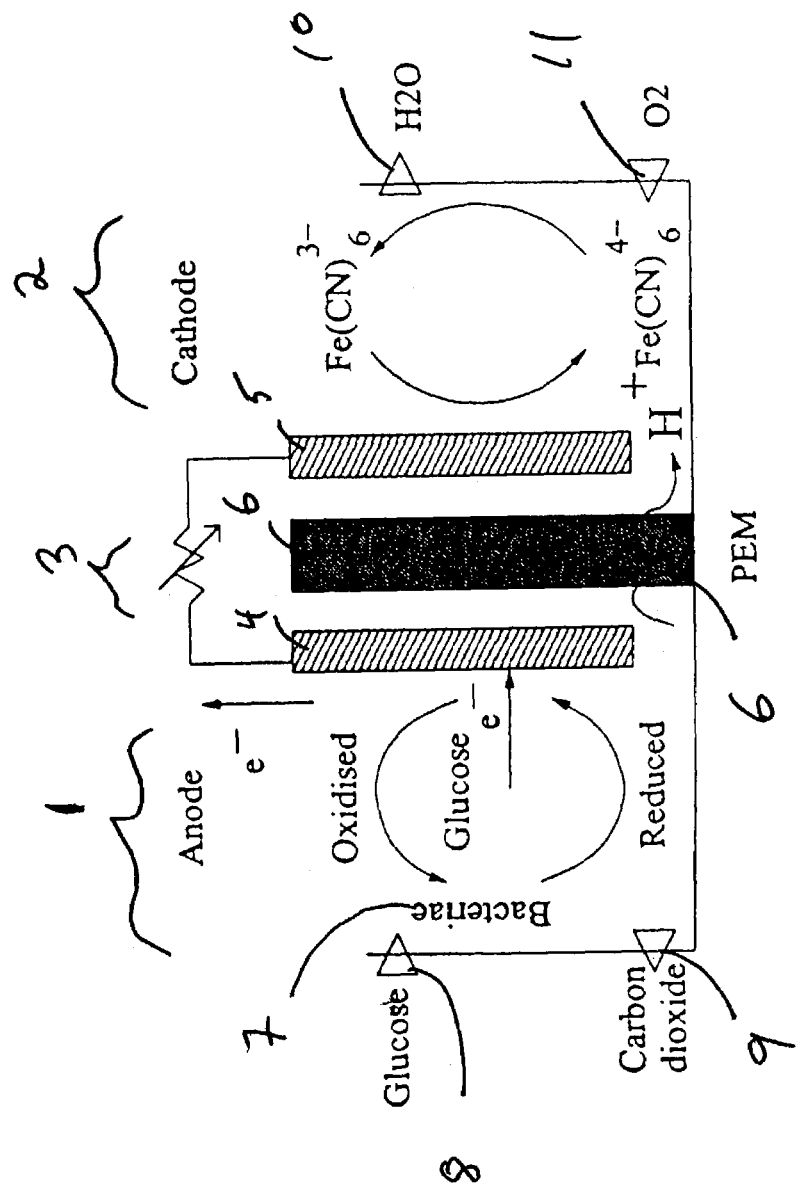
FIG. 1 depicts the operation of a typical microbial fuel cell in schematic, cross-sectional view.

FIG. 1 depicts in schematic cross-sectional view (not to scale) the operational principles of a microbial fuel cell pursuant to some embodiments of the present invention. To be concrete in our description, we describe the example of a microbial fuel cell employing baker's yeast, *Saccharomyces cerevisiae* (*S.c.* or simply yeast) metabolizing glucose. This is by way of illustration not limitation as other bacteria or combinations of bacteria can also be used in combination with other metabolites or mixtures or combinations of metabolites. Examples of other electricity-producing bacteria include *Escherichia Coli, Proteus Vulgaris, Bacillus, Actinobacillus succinogenes, Anabena variabilis, Clostridium, Desulfovibrio, Shewanella* (including *Shewanella putrefaciens*), among others.

In the anode compartment of the fuel cell 1, one or more bacteria 7 are used as a biocatalyst in a buffer solution also containing the nutrient or fuel for the fuel cell. For example, glucose, $C_6H_{12}O_6$, is metabolized in aqueous medium to yield protons ($H^+$), electrons ($e^-$), carbon dioxide ($CO_2$), and other products, in a complex series of biochemical steps. The biocatalytic half-reaction in the anode compartment of the fuel cell is summarized as $$C_6H_{12}O_6 + 6H_2O \rightarrow 6CO_2 + 24e^- + 24H^+ \qquad \text{Eq. 1}$$

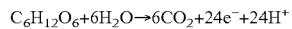

The electrons are transferred to the anode 4 and then to the external electrical load 3. The protons are driven by the electric field through a proton exchange membrane ("PEM") 6 to be available for the formation of water in the cathode compartment 2.

The electron transfer efficiency to the anode is typically increased greatly by the inclusion of an electron transfer mediator ("mediator") in the anolyte. That is, a solution component (or components) effective at extracting free electrons from the metabolic process of the microbe and delivering them to the anode is typically included in the anolyte. Typical electron mediators added to the anolyte suspension include methylene blue, methyl viologen and other viologen dyes, neutral red, thionine, HNQ (2-hydroxyl-1,4-naphthoquinone), Fe(III)EDTA (Fe(III) ethylenediaminetetraacetic acid), among others. The examples of microbial fuel cells described herein use methylene blue as an electron mediator by way illustration and not limitation as other electron mediators (or a fuel cell operating without mediators) are not excluded from the scope of the present invention.

The cathode compartment of the fuel cell 2 contains oxidizing materials for accepting electrons from the cathode, thereby becoming reduced. For example, ferricyanide ion $Fe(CN)_6^{3-}$ (typically in the form of potassium ferricyanide) can be used as an electron acceptor, becoming reduced to ferrocyanide $Fe(CN)_6^{4-}$. The ferrocyanide in the presence of oxygen and protons can be oxidized to regenerate ferricyanide and produce water as the by-product. The half-reaction of the cathode compartment can be summarized as:

$$4Fe(CN)_6^{3-} + 4e^- \rightarrow 4Fe(CN)_6^{4-} \qquad \text{Eq. (2a)}$$

$$4Fe(CN)_6^{4-} + 4H^+ + O_2 \rightarrow 4Fe(CN)_6^{3-} + 2H_2O \qquad \text{Eq. (2b)}$$

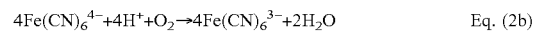

Thus, the overall fuel cell reactions consume glucose 8 and oxygen 11 producing electrons through the external circuit 3 and waste products carbon dioxide 9 and water 10. The consumable materials required, such as glucose and oxygen, are typically readily available, or can readily be made available, in biological systems. The waste products of water and carbon dioxide are fairly benign and readily disposed of when released in modest quantities into a typical biological system. Thus, a microbial fuel cell is advantageous for use in implantable biomedical devices provided however, that the size, electrical characteristics, service lifetime, among other properties, are adequate for implantable devices.

Figure 10:
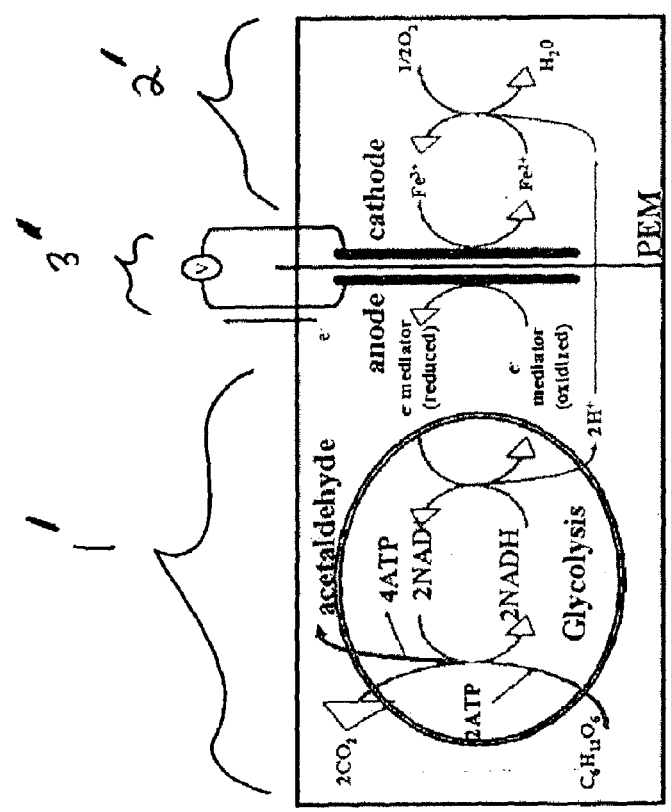
FIG. 10 depicts the operation of a typical microbial fuel cell in schematic cross-sectional view including selected biochemical steps in the glycolysis process.

FIG. 10 depicts a microbial fuel cell consuming glucose in the anode compartment 1' including additional biochemical detail. Glycolysis denotes the enzymatic decompositions of sugars (including glucose), starches and other carbohydrates with the release of energy. Cellular energy is commonly stored in the form of the energy-rich molecule ATP (adenosine triphosphate), two ATP molecules being created in the glycolysis process depicted in 1'. The oxidized form of nicotinamide adenine dinucleotide (NAD) delivers electrons to the electron mediator, and is reduced to NADH. The electron mediator delivers its electron cargo to the anode and the external electrical circuit 3', returning to continue the cycle. As in FIG. 1, protons pass through the proton exchange membrane into the cathode compartment 2' to maintain charge balance and to provide excess protons for the formation of water.

Practical implantable microbial fuel cell power sources typically need to allow for factors such as growth of the microbial colony, death of particular microbes, and finally overpopulation (or a steady-state population) within the anode compartment. Thus, the service lifetime of the fuel cell could be limited by the population and/or by the death rate of the microbes, or provision could be made for disposal of the dead microbes and essentially unlimited steady-state operation. In some embodiments, it would be advantageous for the anolyte to contain one or more components for destroying the remains of dead microbes, rendering the remains suitable for introduction into the surrounding biological system. In other embodiments, it would be advantageous to provide a microbe "cemetery" as a structure or region within the fuel cell into which dead microbes can collect, perhaps by settling to the bottom of the anode compartment by gravity. The cemetery structure can be provided with an access port for extraction of the dead microbes, or be equipped with a suitable disposal mechanism or disposal chemical(s) for rendering the microbe's remains suitable for introduction into the surrounding biological environment. Both in situ disposal and collection could be used concurrently. Access ports for microbe removal and/or replacement can also be included in addition to those ports used for fluid entry and exit depicted in FIG. 1.

Several factors are typically taken into account in the design of a practical microbial fuel cell. For example: 1) It is advantageous for the biocatalytic, proton/electron-producing reactions to take place in the immediate vicinity of the PEM, thereby keeping the distance that must be traveled by the proton relatively small and improving the energy transfer efficiency of electrical energy to the external circuit. 2) The ratio of surface area-to-volume of the anode and cathode compartments should be as large as is feasible in order to achieve high energy density in the fuel cell as well as high coulombic yield.

While microbial fuel cells are known in the art, the present invention includes the development and use of micromachining and microfabrication techniques to produce a miniature microbial fuel cell. The present invention further relates to the development, use and combination of materials and components that typically render the microbial fuel cell suitable for powering implantable medical devices, MEMS structures, or other devices.

By confining the fuel cell with a suitable material, the fuel call can be rendered biocompatible. For example, the materials such as polysaccharides, porous silicon, PTFE (polytetrafluoroethylene), among others can be advantageously used to achieve biocompatibility.

In addition to surface biocompatibility, the fuel cell container typically has openings therein to permit the entry of additional fuel and the exit of waste products. Advantageously, these fluid ports are sufficiently large so as to permit the passage of fuel and waste without undue risk of clogging or diffusion-limiting passage, but also sufficiently small that the microbial contents of the anode compartment does not come into contact with the biological medium surrounding the fuel cell. Should the fuel cell be located in a biological environment including antibodies, contact of the antibodies with the microbial contents of the anode region might trigger the organism's immune response, leading to rejection of the fuel cell. Fluid ports having a diameter of approximately 30 nanometer are typically adequate. Membranes selectively permeable to fuel and/or waste products can also be used instead of (or in combination with) fluid ports.

EXAMPLES

Fuel Cell Structure I (FC-I)

Figure 2:
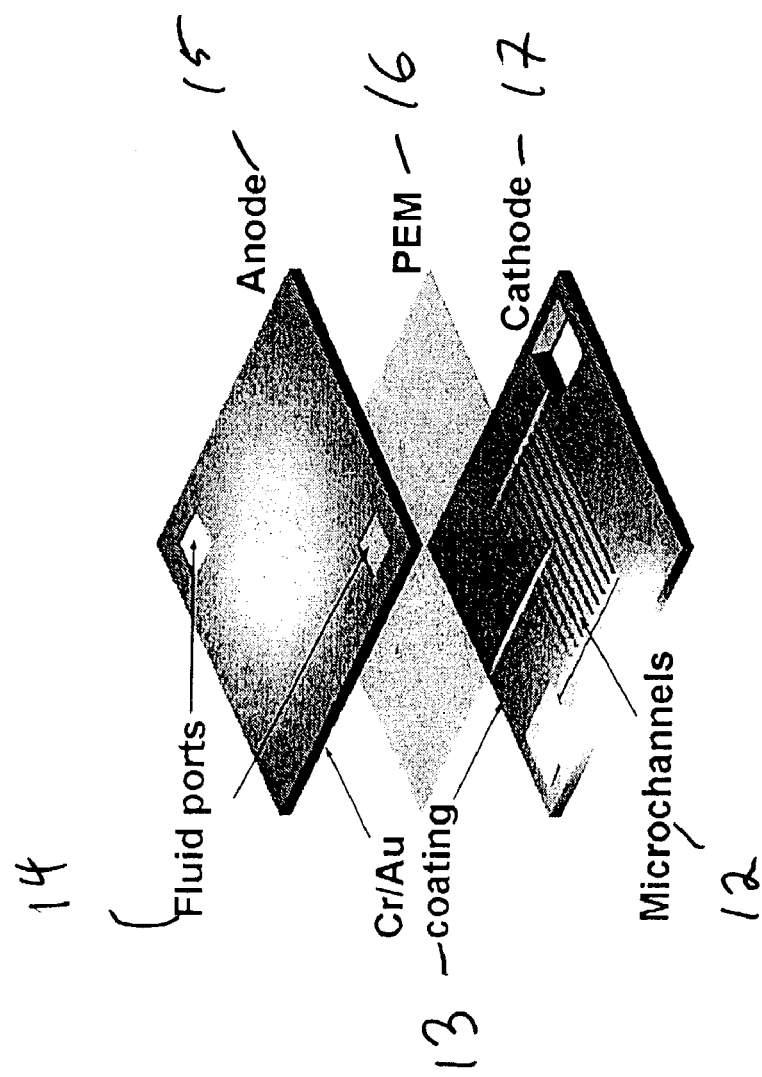
FIG. 2 is an exploded perspective view of typical components of a miniaturized microbial fuel cell pursuant to some embodiments of the present invention.

FIG. 2 depicts an exploded view of a typical micromachined microbial fuel cell pursuant to some embodiments of the present invention. Among the challenges in producing a microbial fuel cell of small size is to produce sufficient electrode surface area to provide adequate electrical performance in a small fuel cell. One approach used herein is to form micromachined channels 12 in the electrode (cathode/anode) compartments to achieve high surface area-to-volume ratios. The micromachined channels provide enhanced access to the PEM and to the electrode. The channels machined into the cathode 17 are depicted as 12 in FIG. 2. Corresponding microchannels are fabricated in the anode 15 not visible in the perspective view of FIG. 2. The microchannel surfaces are typically coated with a conductor 13 such as Cr/Au as current collectors. A typical thickness for the Cr/Au conductor is approximately 2000–2500 Angstroms (Å). The cathode 17 and anode 15 sandwich the PEM 16 as depicted in FIG. 2.

Figure 3:
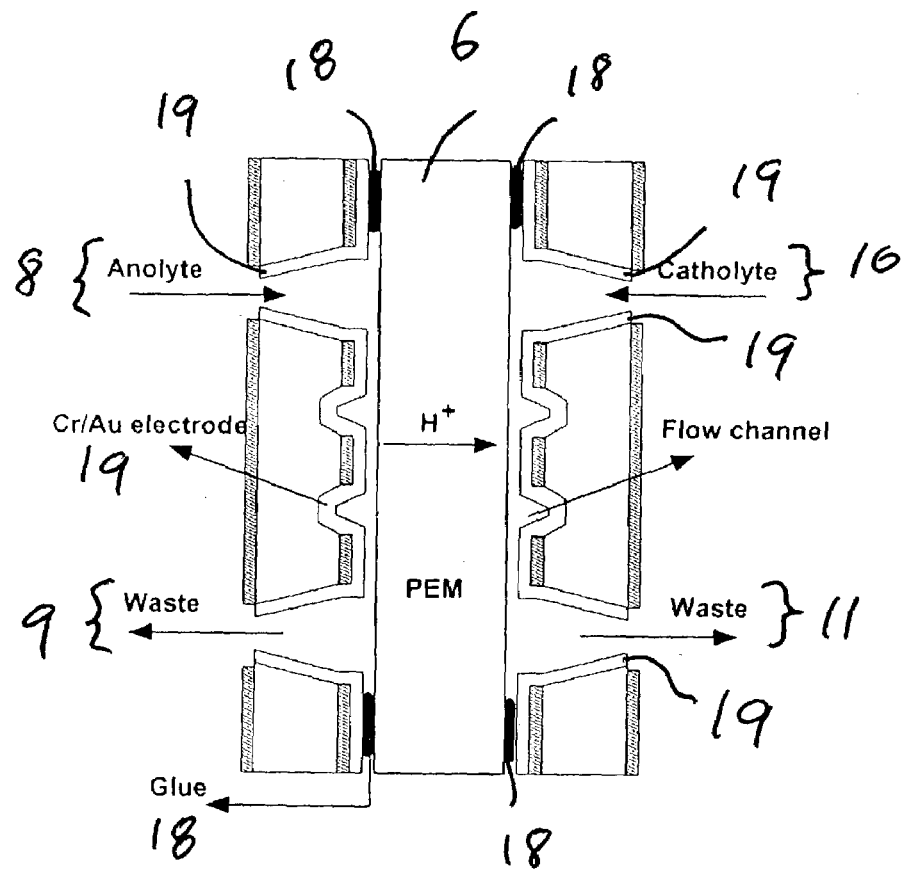
FIG. 3 depicts a schematic, cross-sectional view of a typical miniaturized microbial fuel cell.
Figure 4:
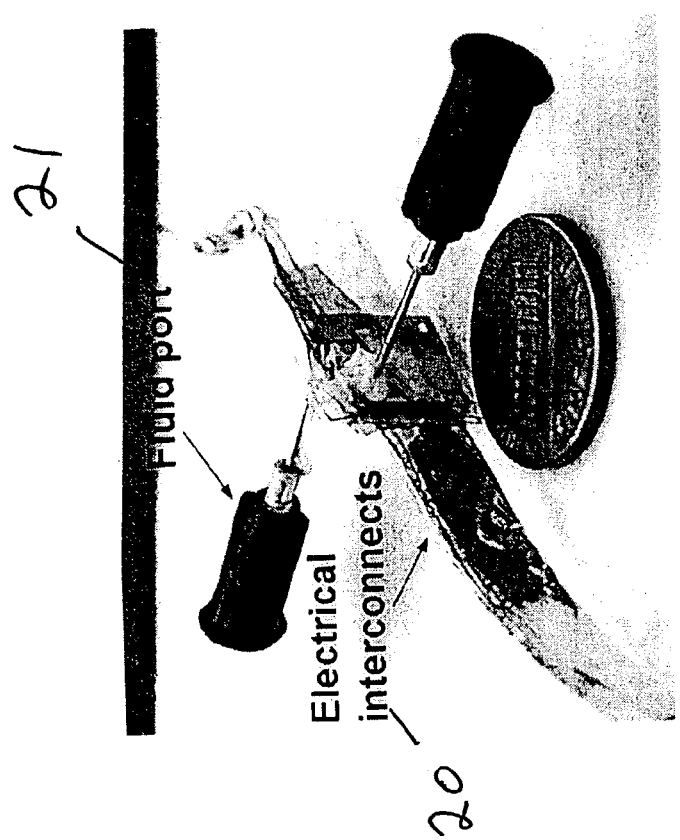
FIG. 4 is a perspective view of a typical miniaturized microbial fuel cell pursuant to some embodiments of the present invention, assembled for bench testing.

DuPont Nafion-117™ film is advantageously used as the PEM pursuant to some embodiments of the present invention. The PEM is typically prepared following the procedure given in Table I. The cleaning procedure of Table I typically removes metallic and organic contaminants on the PEM surface. Following cleaning, the PEM needs to be handled with care to preserve its proton-conducting capability. As depicted in FIG. 3, the cleaned PEM is glued to the silicon substrates at the edges following deposition of the Cr/Au conductor material. Electrical contact from the fuel cell to the outside world is typically made by attaching aluminum or other conducting foil to the Cr/Au surface. Syringe needles are conveniently used for to establish fluid interconnections, leading to the final structure shown in FIG. 4.

The size of the microchannels in the anode compartment are advantageously selected such that flow of microorganisms occurs without substantial impediment and without substantial risk of clogging. For typical yeast cells having a diameter of approximately 10 μm (μm=micron=$10^{-6}$ meter), it is found that anode microchannels approximately 100 μm wide and approximately 80 μm deep provide adequate performance under most circumstances.

Since the cathode compartment does not carry microorganisms, the dimensions of the cathode microchannels are not restricted by the same flow considerations applied to the anolyte containing the microorganism and can be any convenient dimension. However, fabrication is simplified if both anode and cathode microchannels have the same structure. Thus, for ease of depiction, the figures and descriptions herein implicitly use substantially similar microchannels in the anode and cathode regions, recognizing that this is for convenience and not a limitation on the present invention.

FIG. 3 depicts a cross-sectional view of the fuel cell structure pursuant to some embodiments of the present invention depicting the PEM 6 glued at the edges 18 to both the cathode and anode structures. For this fuel cell embodiment, syringe needles are conveniently used to establish fluid interconnections (input) for the anolyte 8 and the catholyte 10. Electrical connections are made typically by attaching a conductive foil (conveniently aluminum) to the Cr/Au surface 19. A perspective view of this fuel cell embodiment is given in FIG. 4 including the syringe fluid injectors 21, the electrical connections external to the fuel cell 20, and a US one cent coin for size comparison.

Figure 7:
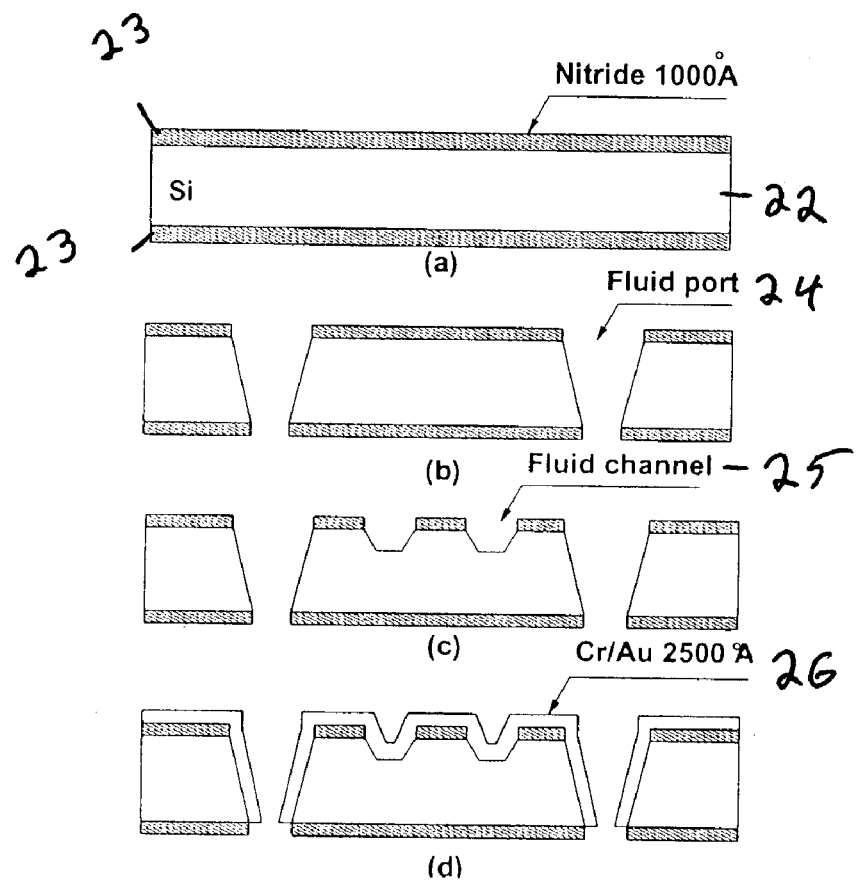
FIG. 7 depicts schematic cross-sectional views of typical steps in the fabrication of fuel cell component substructures from silicon.

A typical fabrication process for fuel cells pursuant to some embodiments of the present invention is depicted schematically in FIG. 7. A silicon wafer 22 is coated with low stress silicon nitride 23 having a typical thickness of about 1000 Angstroms (Å), as depicted in FIG. 7a (1000 Å=0.1 μm). LPCVD (low pressure chemical vapor deposition) is one technique that can be employed for the deposition of the nitride layer. Using the nitride layer as a hard mask, fluid ports 24 are photolithographically produced in the silicon wafer as depicted in FIG. 7b. An anisotropic etchant, typically KOH:H$_2$O in a ratio of approximately 1:2 by weight at a temperature of approximately 80 deg C. is used to etch fluid ports 24 having slanted side-walls, as depicted in FIG. 7b. A second photolithographic etch is used to produce the fluid channels, as depicted in FIG. 7c. It is convenient in this photolithographic step to use relatively thick photoresist (about 9 µm) in order to overcome surface roughness that is typically introduced by the first KOH etch. Timed KOH etch is then used to produce the fluid channels depicted in FIG. 7c.

Following the fabrication of the fluid ports and the fluid channels as depicted in FIGS. 7b and 7c, Cr/Au 26 is deposited onto the silicon microchannels as current collector. Typically, thermal evaporation of a Cr/Au film to a thickness of about 2500 Å is carried out. The slanted side-walls of the fluid channels and the fluid ports produced by the preceding anisotropic etching steps facilitate a substantially conformal deposition of Cr/Au, and facilitate electrical connection of the cathode and anode of the present fuel cell with the external load.

Figure 8:
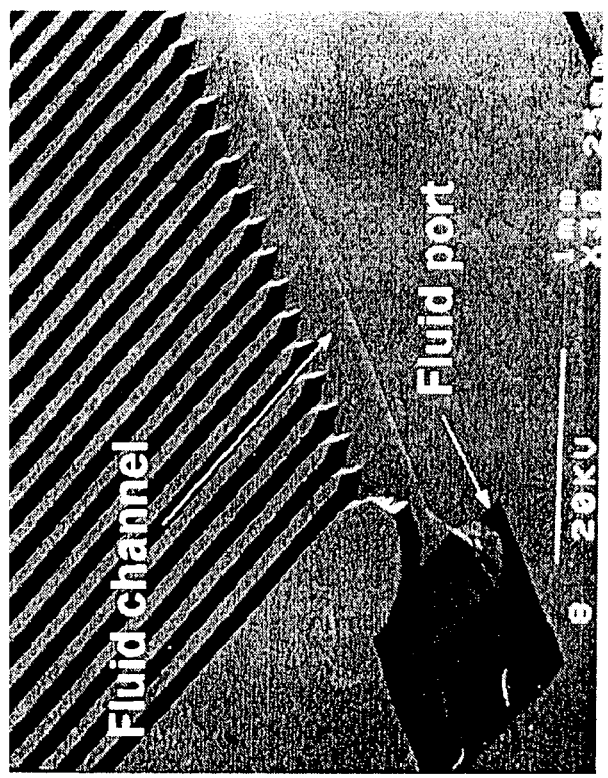
FIG. 8 is a scanning electron micrograph of a fluid port and fluid microchannels.
Figure 9:
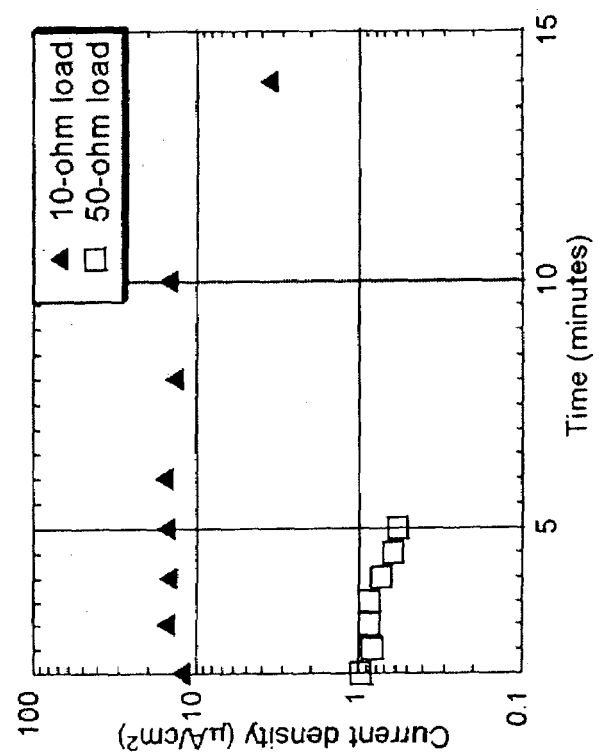
FIG. 9 depicts the results of discharge tests conducted under a 10 ohm load (▲) and a 50 ohm load (□).

FIG. 8 is a scanning electron micrograph of the fluid port and microchannels. The area of the fluid port is approximately 1000 µm×1000 µm. The fluid channels are typically about 100 µm in width and approximately 6200 µm in length. The total electrode area is approximately 0.51 cm$^2$, and the surface area-to-volume ratio is about 500 cm$^{-1}$. By way of comparison, a plain electrode surface (without fluid channels) has a surface-to-volume ratio of about 120 cm$^{-1}$.

Microbe Preparation

The Baker's yeast or *Saccharomyces cerevisiae* (*S.c.*) is conveniently used as the power-producing microbe in connection with some embodiments of the present invention. However, other microbes are known to have the capability to power fuel cells as described above. Modifications to the present invention to make use of microbes other than *S.c.* will be apparent to those with ordinary skills in the art and are included within its scope.

The culturing of *S.c.* follows the biological laboratory procedures given by Davis: *Basic Cell Culture: A Practical Approach*. Oxford; N.Y., IRL Press, 1994. The nutrient suitable for growing the yeast is prepared by mixing agar powders with glucose, yeast extracts and dissolved in distilled water. The agate nutrient is then placed into an autoclave chamber at approximately 120 deg. C. for approximately 1 hour. 120 deg. C. is used since this temperature is typically sufficient to kill unwanted bacterial species possibly pre-existing in the nutrient mixture, and thereby prevent them from interfering with or killing the yeast during later culturing.

After autoclaving, the nutrient mixture is in a liquid form and is conveniently poured into one or more receptacles such as petrie dishes before the mixture cools and solidifies at a temperature of approximately 42 deg. C. The nutrient-filled petrie dishes can be stored under refrigeration before use. The mother strain of *S.c.* is conveniently purchased from biological supply companies, such as Carolina Biological Supply Company, 2700 York Road, Burlington, N.C. 27215-3398, and stored under refrigeration prior to use. The strain of *S.c.* is conveniently added to the nutrient petrie dish by physically rubbing the yeast from the mother plate with a sterile platinum loop and then streaking onto the surface of the nutrient petrie dish. The petrie dish is then typically covered and incubated at room temperature for approximately 48 hours.

Anolyte and Catholyte

Anolyte

The anolyte and catholyte solutions are now prepared. For the anolyte, the microorganism culture is mixed with approximately 1 Molar (1M) glucose in an approximately 0.1M phosphate buffer (pH about 7.0). Methylene blue is used as the electron transfer mediator, typically about 0.01M, added to the microorganism-glucose-buffer solution to promote the transfer of electrons to the anode from the microbial metabolism of glucose. The resulting solution has about 100 gm/l of yeast and about 500 gm/l glucose. In addition, sufficient aeration is provided to facilitate and enhance the biocatalytic process, typically by hand-shaking for approximately 2–5 minutes.

Catholyte

The catholyte is prepared as approximately 0.02M potassium ferricyanide solution in approximately 0.1 M phosphate buffer (pH about 7.0).

The preceding anolyte and catholye solutions were used for all the examples of fuel cell performance described herein. The bio-electrical performance of the fuel cell is measured by dropping a single drop (about 0.16 cm$^3$ in volume) of the anolyte solution and the catholyte solution onto the anode and cathode respectively.

Example 1

Figure 5:
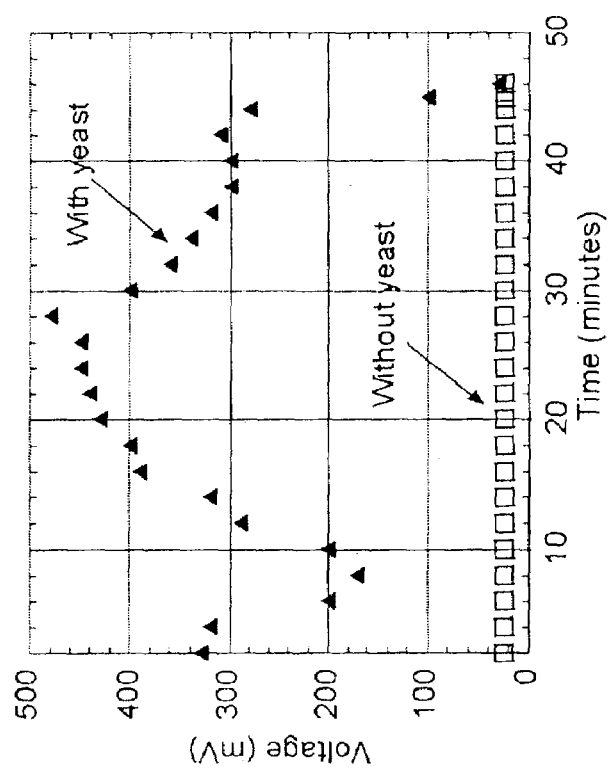
FIG. 5 depicts the open circuit voltage response of a typical microbial fuel cell of FIG. 2 including yeast (▲) and without yeast (□) present in the anolyte.

The open circuit voltage response as a function of time of the above microbial fuel cell (FC-I) is depicted in FIG. 5. In both cases depicted in FIG. 5, methylene blue was used as an electron mediator in the anode compartment. For anolyte solution including yeast (solid triangles), the open circuit voltage fluctuates from about 160 millivolts (mV) to about 480 mV with an average voltage over the 43 minute test period of approximately 343 mV. For anolyte without yeast (open squares), but otherwise having the same composition as the solid triangles, the voltage is seen to remain at a substantially constant 25 mV.

Example 2

The effect of methylene blue electron mediator on fuel cell performance is considered. Anolyte without methylene blue (but including yeast) is introduced into the anode compartment. The open circuit potential is found to increase from about 25 mV to about 40 mV in about 10 minutes, and then to remain at about 40 mV for approximately 30 minutes more. When fresh anolyte is added into the fuel cell's anode compartment along with the anolyte already present, a time delay of approximately 10 min to 15 min is observed before the open circuit potential reaches its peak value.

The ramping rate of the open circuit potential seen in FIG. 5 may be largely determined and limited by the rate of yeast metabolism and could be improved if a more metabolically active microbe were used.

The decline in open circuit potential observed to occur in FIG. 5 after about 30 minutes is likely due to the consumption of available glucose and the consequent decline in the rate of production of electrons and protons.

Example 3

Figure 6:
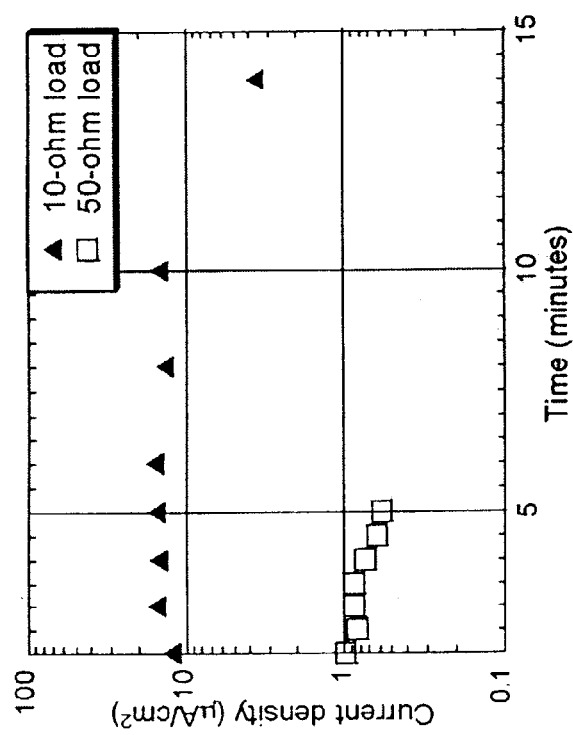
FIG. 6 depicts the results of discharge tests conducted under a 10 ohm load (▲) and a 50 ohm load (□).

Fuel cell discharge tests were also performed under 10 ohm and 50 ohm loads and results are given in FIG. 6. Under a 50 ohm load, the current initially jumped to approximately 1.3 $\mu A/cm^2$ (microamps/sq. cm.) after the first few drops of anolyte and catholyte were introduced into the anode and cathode respectively. The current density under 50 ohm load dropped to approximately 0.58 $\mu A/cm^2$ after about 5 minutes. However, it is consistently observed that the current density recovers to about 1.2 $\mu A/cm^2$ after fresh drops of anolyte and catholyte are introduced into the fuel cell. Under a 10 ohm load, the current density initially rises to approximately 15 $\mu A/cm2$ then drops to approximately 3.6 $\mu A/cm^2$ after about 14 minutes. The power density of the fuel cell ($I^2R$) is approximately 0.5 microwatt per $cm^3$ under a 10 ohm load.

Fuel Cell Structure II (FC-II)

Figure 11:
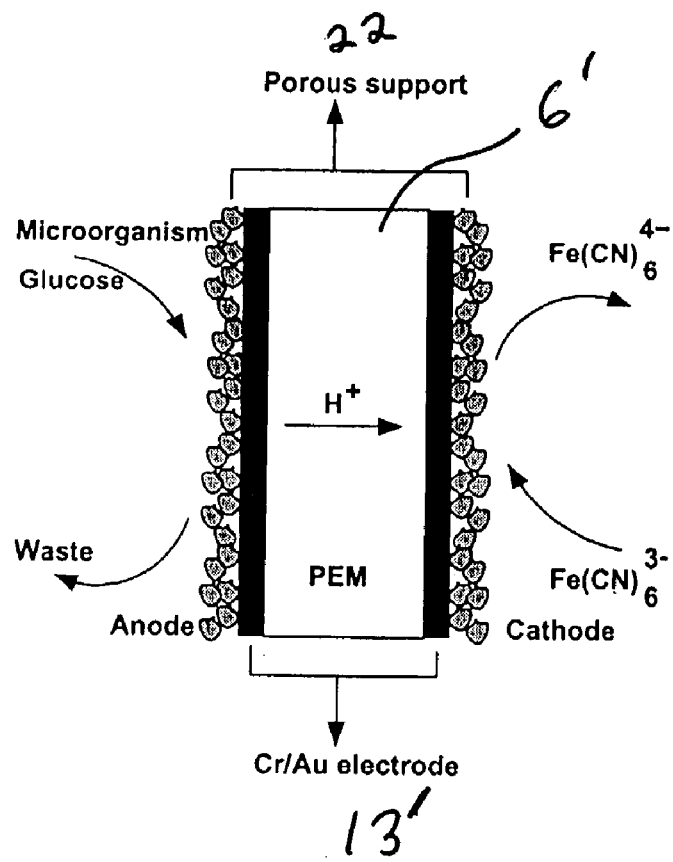
FIG. 11 depicts in schematic cross-sectional view a structure of a microbial fuel cell.
Figure 12:
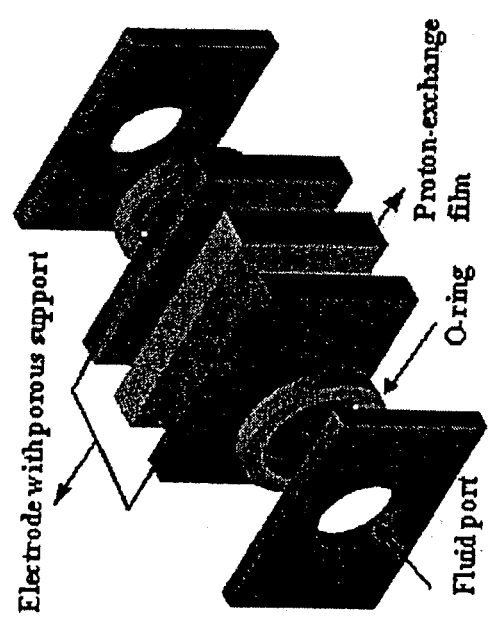
FIG. 12 is an exploded perspective view of typical components of a miniaturized microbial fuel cell pursuant to some embodiments of the present invention.

FIG. 11 depicts in cross-sectional view the anode-PEM-cathode assembly typically used in some embodiments of the present invention. The PEM is conveniently chosen to be DuPont Nafion-117. Filter papers having approximately 0.2 micrometer porosity are advantageously used as the electrode support elements and coated with Cr/Au, typically by thermal evaporation. The electrodes and porous supports are then attached to the PEM, typically by thermal compression bonding. FIG. 12 depicts an exploded, perspective view of the microbial fuel cell thus produced. The electrode areas are approximately 0.07 $cm.^2$ and the fluid ports are typically made of plastic with O-ring seals to reduce or prevent leakage. The final assembly includes gluing the fluid ports and the electrode/PEM assembly of FIG. 11 into a package suitable for testing and use.

The bio-electrical responses of this fuel cell (FC-II) are measured upon dropping a single drop (approximately 0.16 $cm^3$) of the anolyte and catholyte solutions into the respective compartments. Electrical signals are measured over time following the introduction of drops of anolyte and catholyte. Anolyte and catholyte solutions are prepared as described above.

Example 4

Figure 13:
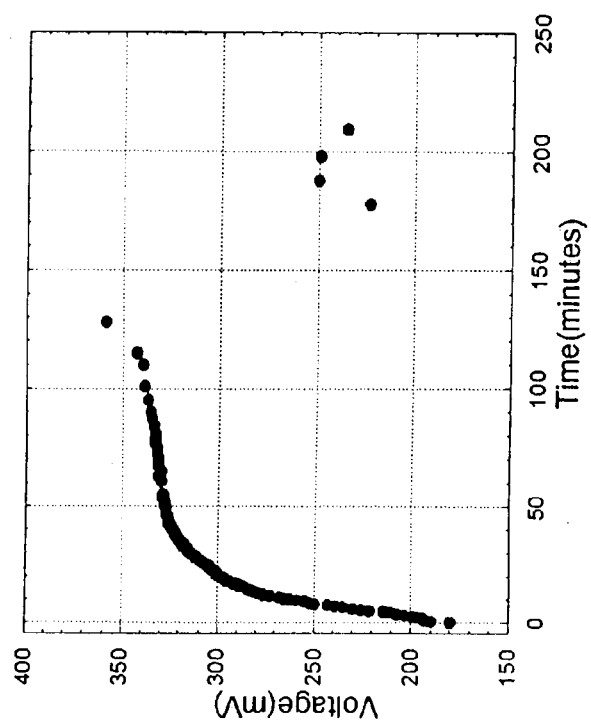
FIG. 13 depicts the open circuit voltage response of a typical fuel cell of FIG. 12.

The open circuit voltage response as a function of time of the above microbial fuel cell (FC-II) is depicted in FIG. 13. The voltage increases to approximately 300 mV and persists at or above that level for more than 2 hours. The drop in voltage seen after more than approximately 2 hours is attributed to the solutions drying in the ambient air.

Example 5

Figure 14:
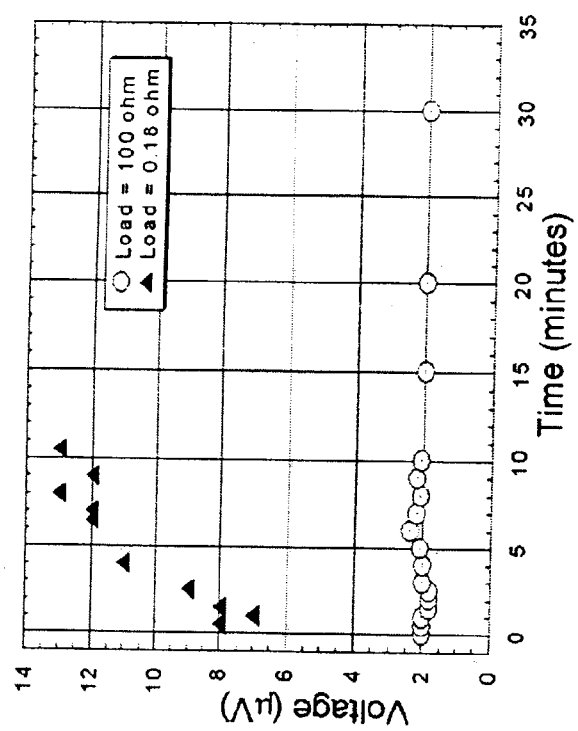
FIG. 14 depicts the results of discharge tests conducted under a 0.18 ohm load (▲) and a 100 ohm load (○).

Fuel cell discharge experiments have also been conducted under the same conditions and using the same anolyte and catholyte described in Example 4. The results are depicted in FIG. 14 for two loading conditions, 0.18 ohms and 100 ohms. As depicted in FIG. 14, the voltage under 0.18 ohm load initially increases to approximately 13 microvolts ($\mu V$) in approximately 10 minutes. Under a load of 100 ohms, the voltage maintains a substantially constant value of approximately 2 $\mu V$ for approximately 30 minutes, generating a current density of approximately 286 nanoamps/$cm^2$.

Although various embodiments which incorporate the teachings of the present invention have been shown and described in detail herein, those skilled in the art can readily devise many other varied embodiments that still incorporate these teachings.

TABLE I

Preparation Procedure for DuPont Nafion ™ Film for Use as Proton Exchange Membrane (PEM)

| Step | Solution (boiling) | Time (hours) |
|---|---|---|
| 1 | $H_2O_2:H_2O$ = 1:9 by volume | 1 |
| 2 | $H_2O$ | 2 |
| 3 | $H_2SO_4:H_2O$ = 1:9 by volume | 1 |
| 4 | $H_2O$ | 2 |

What is claimed is:

1. A microbial fuel cell comprising:
  a) an anode in an anode compartment and in contact with an anolyte containing a plurality of electricity-producing microbes and nutrient substances therefore, further comprising means for nutrient ingress and waste egress from said anode compartment; and,
  b) a cathode in a cathode compartment in contact with a catholyte containing materials therein capable of accepting electrons from said cathode, further comprising means for oxygen ingress and waste egress from said cathode compartment; and,
  c) a proton exchange membrane configured so as to allow passage of protons from said anode compartment to said cathode compartment; and,
  wherein said anode comprises a substrate having a plurality of substantially parallel microchannels therein, wherein said microchannels have a current collecting coating thereon, and said coated microchannels have dimensions so as to provide no substantial impediment to the flow of said microbes therethrough; and,
  wherein said microbes are bacteria.

2. A microbial fuel cell as in claim 1 further comprising an electron mediator in said anolyte.

3. A microbial fuel cell as in claim 1 wherein said microbe is baker's yeast.

4. A microbial fuel cell as in claim 1 wherein said nutrient is glucose.

5. A microbial fuel cell as in claim 1 wherein said electron mediator is methylene blue.

6. A microbial fuel cell as in claim 1 wherein said electron accepting material is iron ferricyanide ion.

* * * * *